United States Patent
Bastioli et al.

(10) Patent No.: US 9,676,902 B2
(45) Date of Patent: Jun. 13, 2017

(54) ALIPHATIC-AROMATIC COPOLYESTERS AND THEIR MIXTURES

(75) Inventors: Catia Bastioli, Novara (IT); Giampietro Borsotti, Novara (IT); Luigi Capuzzi, Novara (IT); Tiziana Milizia, Novara (IT); Roberto Vallero, Borgo D'ale (IT)

(73) Assignee: NOVAMONT S.P.A., Novara (IT)

( * ) Notice: Subject to any disclaimer, the term of this patent is extended or adjusted under 35 U.S.C. 154(b) by 0 days.

(21) Appl. No.: 13/699,939

(22) PCT Filed: May 24, 2011

(86) PCT No.: PCT/EP2011/058422
§ 371 (c)(1),
(2), (4) Date: Nov. 26, 2012

(87) PCT Pub. No.: WO2011/147806
PCT Pub. Date: Dec. 1, 2011

(65) Prior Publication Data
US 2013/0071588 A1    Mar. 21, 2013

(30) Foreign Application Priority Data
May 24, 2010 (IT) ............... MI2010A0932

(51) Int. Cl.
| | |
|---|---|
| C08G 63/16 | (2006.01) |
| C08L 67/02 | (2006.01) |
| C08G 63/181 | (2006.01) |
| C08L 67/04 | (2006.01) |
| B32B 1/02 | (2006.01) |
| C08G 18/32 | (2006.01) |
| C08G 65/00 | (2006.01) |
| C08G 69/00 | (2006.01) |
| C08G 73/02 | (2006.01) |
| C08L 1/00 | (2006.01) |
| C08L 3/00 | (2006.01) |
| C08L 5/04 | (2006.01) |

(Continued)

(52) U.S. Cl.
CPC .............. *C08G 63/16* (2013.01); *B32B 1/02* (2013.01); *C08G 18/3203* (2013.01); *C08G 63/181* (2013.01); *C08G 65/00* (2013.01); *C08G 69/00* (2013.01); *C08G 73/02* (2013.01); *C08L 1/00* (2013.01); *C08L 3/00* (2013.01); *C08L 5/04* (2013.01); *C08L 5/08* (2013.01); *C08L 7/00* (2013.01); *C08L 67/02* (2013.01); *C08L 67/04* (2013.01); *C08L 89/00* (2013.01); *C08L 93/04* (2013.01); *D02G 3/045* (2013.01); *C08L 67/025* (2013.01); *Y10T 428/1345* (2015.01); *Y10T 428/1376* (2015.01); *Y10T 428/1397* (2015.01); *Y10T 428/2904* (2015.01); *Y10T 428/2929* (2015.01); *Y10T 428/2973* (2015.01); *Y10T 428/3179* (2015.04); *Y10T 428/31681* (2015.04); *Y10T 428/31786* (2015.04); *Y10T 442/30* (2015.04); *Y10T 442/60* (2015.04); *Y10T 442/68* (2015.04); *Y10T 442/681* (2015.04)

(58) Field of Classification Search
CPC .. C08G 63/16; C08G 63/672; C08G 18/4854; C08G 63/181; C08G 63/78; C08G 63/85; C08G 2230/00; C08G 63/12; C08G 63/6856; C08G 63/6886; C08G 63/80; C08G 63/914
See application file for complete search history.

(56) References Cited

U.S. PATENT DOCUMENTS

2011/0071238 A1*   3/2011   Bastioli et al. ............. 524/17

FOREIGN PATENT DOCUMENTS

| JP | 2001-081165 A | 3/2001 |
|---|---|---|
| JP | 2008-291244 | * 12/2008 |
| WO | WO-2009/135921 A1 | 11/2009 |

OTHER PUBLICATIONS

Manasek "Modified fiber-forming polyesters from 2,5-furandicarboxylic acid", 1968,pp. 35-38 ( Article ).*

(Continued)

*Primary Examiner* — Ling Choi
*Assistant Examiner* — Gennadiy Mesh
(74) *Attorney, Agent, or Firm* — Polsinelli PC

(57) ABSTRACT

Aliphatic-aromatic copolyester comprising the repeating units, which comprise a dicarboxylic component and a dihydroxylic component:

—[—O—($R_{11}$)—O—C(O)—($R_{13}$)—C(O)—]—

—[—O—($R_{12}$)—O—C(O)—($R_{14}$)—C(O)—]—.

The dihydroxylic component comprises units —O—($R_{11}$)—O— and —O—($R_{12}$)—O— from diols, wherein $R_{11}$ and $R_{12}$ individually are selected from $C_2$-$C_{14}$ alkylene, $C_5$-$C_{10}$ cycloalkylene, $C_2$-$C_{12}$ oxyalkylene, heterocycles and mixtures thereof. The dicarboxylic component comprises units —C(O)—($R_{13}$)—C(O)— from aliphatic diacids and units —C(O)—($R_{14}$)—C(O)— from aromatic diacids, wherein $R_{13}$ is $C_0$-$C_{20}$ alkylene and mixtures thereof. The aromatic diacids comprise at least one heterocyclic aromatic diacid of renewable origin, and preferably furandicarboxylic acid. The molar percentage of the aromatic diacids is >90% and <100% of the dicarboxylic component. The aliphatic-aromatic copolyester has appreciable workability, toughness and high values for ultimate tensile strength and elastic modulus. It can be mixed with other polymers.

13 Claims, No Drawings

(51) Int. Cl.
*C08L 5/08* (2006.01)
*C08L 7/00* (2006.01)
*C08L 89/00* (2006.01)
*C08L 93/04* (2006.01)
*D02G 3/04* (2006.01)

(56) References Cited

OTHER PUBLICATIONS

Manasek, "Modified fiber-forming polyesters from 2,5-furandicarboxylic acid", Khimicheskie Volokna, (6), 35-8, Coden: KVLKA4; ISSN: 0023-1118.

* cited by examiner

ALIPHATIC-AROMATIC COPOLYESTERS AND THEIR MIXTURES

CROSS REFERENCE TO RELATED APPLICATIONS

This application is a National Phase filing under 35 U.S.C. §371 of PCT/EP2011/058422 filed on May 24, 2011; and this application claims priority to Application No. MI2010A000932 filed in Italy on May 24, 2010 under 35 U.S.C. §119; the entire contents of all are hereby incorporated by reference.

The present invention relates to an aliphatic-aromatic copolyester characterised by appreciable workability properties even when mixed with other polymers, toughness and high values for tensile maintaining suitable values of elastic modulus and elongation at break and ability to crystallize under stretching which render it particularly useful for the production of mono and bi-oriented films as well as either spunbonded or melt blown fibers.

This invention also relates to mixtures of the said copolyesters with other polymers.

Over the years, polymeric materials have become increasingly widespread on account of their versatility, their ability to be easily processed and their low cost.

Among polymeric materials, isotactic polypropylene is utilized in a wide range of applications such as for example for the production of mono and bi-oriented films as well as either spun bonded or melt blown fibers.

Still, because of its low surface tension polypropylene is not compatible with the majority of known polymers and it is also difficult to paint or colour. For example, polypropylene fibers are generally mass coloured and cannot be dyed after production giving rise to remarkable warehouse management problems. Furthermore, because of the fossil origin of the monomer of which it is constituted, polypropylene contributes also to the depletion of non-renewable feedstocks. Polypropylene from renewable resources, on the other hand, needs energy sources far higher than polypropylene from non-renewable resources There is therefore the need for polymeric material suitable to overcome the above mentioned problems.

Among thermoplastic polymer materials the development of new polyesters has become particularly significant. Polymer materials of this type have in fact found considerable uses in the field of fibres, moulded and blown articles and films.

The growing use of polymer materials in increasingly more technologically advanced sectors of application however requires that new materials capable of ensuring increasingly better performance in use have to be developed.

The problem underlying this invention is therefore that of finding a new polymer showing a range of applicability comparable to that of polypropylene capable of providing high performance when in use, such as high values for toughness, tensile strength, elastic modulus with improved elongation at break and elasticity, as well as ability to crystallize under stretching together with good workability characteristics even when mixed with other polymers.

Starting from this problem it has now been surprisingly found that by suitably selecting monomers type and ratios it is possible to obtain a copolyester having appreciable workability properties even when mixed with other polymers and improved toughness and tensile strength as well as ability to crystallize under stretching, while maintaining high values for elastic modulus and elongation at break.

Thanks to its characteristics, said copolyester results particularly suitable for the production of mono and bi-oriented films as well as either spunbonded or melt blown fibers.

In particular, the present invention relates to an aliphatic-aromatic copolyester formed of a dicarboxylic component and a diol component comprising the following structural units:

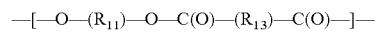

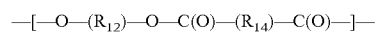

in which the diol component comprises —O—$(R_{11})$—O— and —O—$(R_{12})$—O— units deriving from diols, where $R_{11}$ and $R_{12}$ are the same or different and are selected from the group comprising $C_2$-$C_{14}$ alkylenes, $C_5$-$C_{10}$ cycloalkylenes, $C_2$-$C_{12}$ oxyalkylenes, heterocyclic groups and mixtures thereof, in which the dicarboxylic component comprises —C(O)—$(R_{13})$—C(O)— units deriving from aliphatic diacids and —C(O)—$(R_{14})$—C(O)— units deriving from aromatic diacids, where $R_{13}$ is selected from the group comprising $C_0$-$C_{20}$ alkylenes and their mixtures, in which the aromatic diacids comprise at least one aromatic diacid of renewable origin and in which the molar percentage of the said aromatic diacids is greater than 90% and less than 100% of the dicarboxylic component.

Among the aliphatic diacids, those with number of C atoms in the main chain comprised between 2 and 22, esters and mixtures thereof are preferred, $C_4$ (succinic acid), $C_6$ (adipic acid), $C_7$ (pimelic acid), $C_8$ (suberic acid), $C_9$ (azelaic acid), $C_{10}$ (sebacic acid), $C_{11}$ (undecandioic acid), $C_{12}$ (dodecandioic acid) and $C_{13}$ (brassylic acid), $C_{18}$ (octadecandioic acid) are preferred. Of these, particularly preferred are aliphatic diacids from renewable sources and preferably $C_6$ (adipic acid), $C_8$ (suberic acid), $C_9$ (azelaic acid), $C_{10}$ (sebacic acid), $C_{12}$ (dodecandioic acid) and $C_{13}$ (brassylic acid), their esters and mixtures thereof. Even more preferred are aliphatic acids from renewable sources $C_9$ (azelaic acid), $C_{10}$ (sebacic acid) and their esters. Mixtures of these acids are also particularly interesting.

Diacids which have unsaturations within the chain such as for example itaconic acid and maleic acid are also included.

As far as the —C(O)—$(R_{14})$—C(O)— unit of the copolyester according to this invention is concerned, the aromatic diacids contain at least one aromatic diacid of renewable origin and preferably comprise mixtures of aromatic diacids of synthetic and renewable origin. Preferably, in the case of mixtures of aromatic diacids of synthetic and renewable origin they comprise up to 40% in moles of aromatic diacids of synthetic origin.

By aromatic diacids of synthetic origin in the meaning of this invention are meant aromatic compounds of the phthalic acid type and their esters, preferably terephthalic acid, its esters and/or mixtures thereof.

Among the aromatic diacids of renewable origin in the meaning of this invention, aromatic heterocyclic compounds are preferred and particularly preferred are compounds of the furandicarboxylic acid type and their esters, preferably 2,5-furandicarboxylic acid, its esters and/or mixtures thereof are even more preferred.

Those products obtained from sources which, because of their intrinsic characteristics, regenerate or are not exhaustible over the scale of a human lifetime, and, by extension, whose use does not prejudice natural resources for future generations are regarded as being of renewable origin. The use of products of renewable origin, even from biomass, also helps to reduce $CO_2$ in the atmosphere and reduce the use of non-renewable resources. Typical examples of renewable sources are plant crops and residual biomass for production of sugars. The content of units deriving from aromatic diacids in the copolyester according to this invention is greater than 90% and less than 100%, preferably between 91 and 99%, and more preferably between 92 and 98% in moles with respect to the total content of diacids in moles. As far as the units —O—$(R_{11})$—O— and —O—$(R_{12})$—O— in the copolyester according to this invention are concerned, the diols are preferably selected from 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-indicandiol, 1,12-dodecanediol, 1,13-tridecanediol, 1,4-cyclohexanedimethanol, propylene glycol, neo-pentylglycol, 2-methyl-1,3-propanediol, dianhydrosorbitol, dianhydromannitol, dianhydroiditol, cyclohexanediol, cyclohexanemethanediol, isosorbide and its derivatives, aromatic diols such as phenols, furandiol. Diols of the type $C_2$-$C_{10}$ are particularly preferred. The diols $C_2$-$C_4$ are even more preferred.

Among diols, 1,2-ethanediol, 1,3-propandiol, 1,4-butanediol and mixtures thereof are particularly preferred. Advantageously, said diols are constituted by at least 50%, preferably at least 80% in moles by 1,4 butandiol with respect to the total diol content.

In addition to base monomers the copolyester may contain at least one hydroxy acid in a quantity between 0-49%, preferably between 0-30% in moles with respect to the moles of aliphatic dicarboxylic acid. Examples of convenient hydroxyacids are glycolic acid, hydroxycaproic acid, hydroxyvaleric acid, 7-hydroxyheptanoic acid, 8-hydroxycaproic acid, 9-hydroxynonanoic acid, lactic acid or lactides. The hydroxy acids may be inserted into a chain as such or may be also caused to first react with diacids or diols. Said hydroxy acids can be present with either a random or a block repeating units distribution.

Long molecules with two functional groups including functional groups which are not in the terminal position may also be added in quantities not exceeding 10%. Examples are dimer acids, ricinoleic acid and acids incorporating epoxy groups and also polyoxyethylenes having a molecular weight of between 200 and 10,000.

Amines, amino acids and amino alcohols may also be present in percentages up to 30% in moles with respect to all the other components.

In the process of preparing the copolyester according to this invention one or more molecules with multiple functional groups may also advantageously be added in quantities between 0.1 and 3% in moles with respect to the quantity of dicarboxylic acids (including any hydroxyacids), in order to obtain branched products. Examples of these molecules are glycerol, pentaerythritol, trimethylol propane, citric acid, dipentaerythritol, monoanhydrosorbitol, monohydromannitol, acid triglycerides, polyglycerols, undecylenic acid, triethanolamine, 1,1,2-ethantricarboxylic acid; 1,1,2,2-ethantetracarboxylic acid, 1,3,5 pentantricarboxylic acid, 1,2,3,4-cyclopentantetracarboxylic acid, malic acid, tartaric acid, 3-hydroxyglutaric acid, mucic acid, trihydroxyglutaric acid, hydroxy-isophthalic acid, hexantriol, sorbitol, trimethilethane, mannitol, 1,2,4 butantriol, xilitol, 1,2,4,4-tetrakis (hydroxymethyl)cyclohexane, arabitol, adonitol, iditol.

Although the copolyester according to the present invention reaches high performances without the need to add chain extenders such as isocyanates and isocyanurates, epoxides and in particular polyepoxides, oxazolines or carbodimides, it is nonetheless possible to modify the properties thereof according to necessity.

The increase in molecular weight of the copolyester can advantageously be obtained, for example, through the addition of various organic peroxides during their extrusion processing. The increase in molecular weight of the copolyester can easily be detected by observing the increase of the viscosity values following processing of the polyesters with peroxides.

The molecular weight $M_n$ of the copolyester according to this invention is preferably over 30,000. As far as the polydispersity index of the molecular weights Mw/Mn is concerned, this is preferably between 1.5 and 10, more preferably between 1.5-7 and more preferably between 1.6- and 5 and even more preferably between 1.7 and 3.

Molecular weights $M_n$ and $M_w$ may be measured by Gel Permeation Chromatography (GPC). The determination may be performed with a chromatographic system held at 40° C., using a set of three columns in series (particle diameter 5μ and porosities of 500 A, 1000 A and 10,000 A respectively), a refractive index detector, chloroform as eluent (flow 1 ml/min), and using polystyrene as the reference standard.

In the case of use for typical applications in plastics materials (such as, for example, bubble wraps, injection moulding, foams, etc.) the Melt Flow Rate (MFR) of the copolyester according to this invention is preferably between 1 and 500. g/10 min, more preferably between 3 and 100 g/10 min, and even more preferably between 5 and 50. g/10 min (measurement made at 190° C./2.16 kg in accordance with ASTM standard D1238-89 "Standard Test Method for Melt Flow Rates of Thermoplastics by Extrusion Plastometer"). Preferably the copolyester according to the invention has an inherent viscosity (measured with an Ubbelohde viscosimeter for solutions in o-cresol in a content of 0.2 g/dl at 40° C.) which is greater than 0.4, preferably between 0.4 and 2, and more preferably between 0.7 and 1.5 dl/g. The copolyester according to the invention may be used in a mixture which may also be obtained by reactive extrusion processes with one or more polymers of synthetic or natural origin, which may or may not be biodegradable.

In the meaning of this invention by biodegradable polymers are meant biodegradable polymers according to standard EN 13432.

In particular the copolyester according to the invention may be used in a mixture with biodegradable polyesters of the diacid-diol, hydroxyacid or polyester-ether type.

As far as the said biodegradable polyesters of the diaciddiol type are concerned, these may be either aliphatic or aliphatic-aromatic.

The biodegradable aliphatic polyesters from diacid-diols comprise aliphatic diacids and aliphatic diols, while the biodegradable aliphatic-aromatic polyesters have an aromatic part mainly comprising aromatic acids with multiple functional groups of both synthetic and renewable origin, the aliphatic part being constituted by aliphatic diacids and aliphatic diols. The aromatic aliphatic biodegradable polyesters from diacids-diols are preferably characterised by an aromatic acids content of between 30 and 90% in moles, preferably between 45 and 70% in moles with respect to the acid component.

Preferably the aromatic acids having multiple functional groups of synthetic origin are dicarboxylic aromatic compounds of the phthalic acid type and their esters, preferably terephthalic acid.

The aromatic acids with multiple functional groups of renewable origin are preferably selected from the group comprising 2,5-furandicarboxylic acid and its esters.

Biodegradable aliphatic-aromatic polyesters from diacids-diols in which the aromatic diacid component comprises a mixture of aromatic acids with multiple functional groups of synthetic and renewable origin are particularly preferred.

The aliphatic diacids of the biodegradable aliphatic-aromatic polyesters are aliphatic dicarboxylic acids such as oxalic acid, malonic acid, succinic acid, glucaric acid, adipic acid, pimelic acid, suberic acid, azelaic acid, sebacic acid, undecanoic acid, dodecanoic acid and brassilic acid, their esters and their mixtures. Among these adipic acid and dicarboxylic acids from renewable sources are preferred, and among these dicarboxylic acids from renewable sources such as succinic acid, sebacic acid, azelaic acid, undecanedioic acid, dodecanedioic acid and brassilic acid and their mixtures are particularly preferred.

Examples of aliphatic diols in biodegradable polyesters from diacids-diols are: 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexanedimethanol, neopentylglycol, 2-methyl-1,3-propanediol, dianhydrosorbitol, dianhydromannitol, dianhydroiditol, cyclohexanediol, cyclohexanemethanediol and their mixtures. Of these, 1,4-butanediol, 1,3-propanediol and 1,2-ethanediol and their mixtures are particularly preferred.

Among biodegradable polyesters of the diacid-diol type, particularly preferred are aliphatic/aromatic copolyesters such as for example polybutylene terephthalate-co-sebacate, polybutylene terephthalate-co-azelate, polybutylene terephthalate-co-brassilate, polybutylene terephthalate-co-adipate, polybutylene terephthalate-co-succinate and polybutylene terephthalate-co-glutarate, and aliphatic polyesters such as for example polyalkylene succinates and particularly polybutylene succinate and its copolymers with adipic acid and lactic acid.

Preferably the mixtures of copolyesters according to the invention with biodegradable polyesters from diacids-diols described above are characterised by a content of the said biodegradable polyesters which varies within the range between 1 and 99% by weight, more preferably between 5 and 95% by weight with respect to the sum of the weights of the copolyester according to the invention and the former respectively.

In addition to this the copolyester according to the invention can be mixed with more than one aliphatic-aromatic polyester having an aromatic part mainly comprising aromatic acids with multiple functional groups of both synthetic and renewable origin or their mixtures.

Both binary and ternary mixtures of the copolyester according to the invention with the said polyesters are also particularly preferred.

The preferred biodegradable polyesters from hydroxy acids include: poly-L-lactic acid, poly-D-lactic acid and poly-D-L-lactic acid stereocomplex, poly-ε-caprolactone, polyhydroxybutyrate, polyhydroxybutyrate valerate, polyhydroxybutyrate propanoate, polyhydroxybutyrate hexanoate, polyhydroxybutyrate decanoate, polyhydroxybutyrate dodecanoate, polyhydroxybutyrate hexadecanoate, polyhydroxybutyrate octadecanoate and poly-3-hydroxybutyrate-4-hydroxybutyrate. Among the biodegradable polyesters from hydroxy acids those particularly preferred are poly-L-lactic acid, poly-D-lactic acid and stereo-complex of poly-L-lactic acid and poly-D-lactic acid.

Preferably the mixtures of the copolyester according to the invention with the biodegradable polyesters from hydroxy acids described above are characterised by a content of the said biodegradable polyesters which varies within the range between 1 and 99% by weight, more preferably between 5 and 95% by weight with respect to the sum of the weights of the copolyester according to the invention and the former respectively.

The copolyester according to the invention may also be used in a mixture with polymers of natural origin such as for example starch, cellulose, chitin, chitosane, alginates, proteins such as gluten, zein, casein, collagen, gelatin, natural rubbers, rosinic acid and their derivatives, lignins as such, purified, hydrolysed and base-treated lignins, etc., or their derivatives. The starches and celluloses may be modified and among these mention may for example be made of esters of starch or cellulose having a degree of substitution between 0.2 and 2.5, hydroxypropylated starches, starches modified with fatty chains and cellophane. Mixtures with starch are particularly preferred. Starch may also be used in both the destructured and gelatinised or filler forms. Starch may represent the continuous or dispersed phase and may be in a co-continuous form. In the case of dispersed starch the starch is preferably in form of particles with a mean diameter smaller than a micron and more preferably smaller than a mean diameter of 0.5 μm.

The dimensions of starch particles are measured in the transverse section with respect to the direction of the extrusion flow or, anyhow, with respect to the direction of material's output. For this purpose a sample of the blend which is to be examined is immersed in liquid nitrogen and subsequently fractured so as to obtain a fracture surface along a cross-section of the sample. The portion of the sample which is to be examined is then subjected to selective etching, dried and a thin layer of metal is deposited thereupon, for example a mixture of gold/palladium, using a "sputter coater". Finally the surface of the fracture is examined under a scanning electron microscope (SEM).

The dimension of starch particles is determined measuring the dimensions of the holes on the surface of the fracture after the selective etching of starch.

The mean dimension of the starch particles, i.e. the holes detectable on the etched surface of the fracture, is calculated as the numeral (or arithmetic) average of the particles dimensions.

In case of a spherical particle the dimension of the particle corresponds to the diameter of a circle corresponding to the bidimensional shape resulting from the transverse section. In case of a non-spherical particle the dimension (d) of the particle is calculated according to the following formula:

$$d = \sqrt{d_1 \cdot d_2}$$

where $d_1$ is the minor diameter and $d_2$ is the major diameter of the ellipse in which the particle can be inscribed or approximated.

The selective etching of starch dispersed phase, may be advantageously performed with HCl 5 N as etchant with an etching time of 20 minutes at an etching temperature of 25° C.

Blends containing destructurized starch are preferred.

Starches such as corn and potato starch, capable of being easily destructurizable and which have high initial molecular weights, have proven to be particularly advantageous.

The use of corn and potato starch is particularly preferred.

For destructurized starch, the teachings contained in EP-O 118 240 and EP-O 327 505 are referred to here, this being intended as starch processed so that it substantially has no "Maltese crosses" under the optical microscope in polarized light and no "ghosts" under the optical microscope in phase contrast.

Furthermore, physically and chemically modified starch grades can be used, such as ethoxylated starches, oxypropylated starches, starch acetates, starch butyrate, starch propionates, with a substitution degree comprised within the range of from 0.1 to 2, cationic starches, oxidized starches, crosslinked starches, gelled starches.

Starch blends wherein starch represent the dispersed phase can form biodegradable polymeric compositions with good-resistance to ageing and to humidity. Indeed, these polymeric compositions can maintain a high tear strength even in condition of low humidity.

Such characteristics can be achieved when the water content of the composition during mixing of the component is preferably kept between 1% and 15% by weight. It is, however, also possible to operate with a content of less than 1% by weight, in this case, starting with predried and pre-plasticized starch.

It could be useful also to degrade starch at a low molecular weight before or during compounding with the polyesters of the present invention in order to have in the final material or finished product a starch inherent viscosity between 1 and 0.2 dl/g, preferably between 0.6 and 0.25 dl/g, more preferably between 0.55 and 0.3 dl/g.

Destructurized starch can be obtained before or during the mixing with the polyesters according to the present invention in presence of plasticizers such as water, glycerol, di and poly glycerols, ethylene or propylene glycol, ethylene and propylene diglycol, polyethylene glycol, polypropyleneglycol, 1,2 propandiol, trymethylol ethane, trymethylol propane, pentaerytritol, dipentaerytritol, sorbitol, erytritol, xylitol, mannitol, sucrose, 1,3 propanediol, 1,2 butanediol, 1,3 butanediol, 1,4 butanediol, 1,5 pentanediol, 1,5 hexanediol, 1,6 hexanediol, 1,2,6 hexanetriol, 1,3,5 hexanetriol, neopentyl glycol and polyvinyl alcohol prepolymers and polymers, polyols acetates, ethoxylates and propoxylates, particularly sorbitol ethoxylate, sorbitol acetate, and pentaerythritol acetate.

Water can be used as a plasticizer in combination with high boiling point plasticizers or alone during the plastification phase of starch before or during the mixing of the composition and can be removed at the needed level by degassing on one or more steps during extrusion. Upon completion of the plastification and mixing of the components, the water is removed by degassing to give a final content of about 0.2-3% by weight.

Water, as well as high-boiling point plasticizers, modifies the viscosity of the starch phase and affects the rheological properties of the starch/polymer system, helping to determine the dimensions of the dispersed particles. Compatibilizers can be also added to the mixture. They can belong to the following classes:

Additives such as esters which have hydrophilic/lipophilic balance index values (HLB) greater than 8 and which are obtained from polyols and from mono or polycarboxylic acids with dissociation constants pK lower than 4.5 (the value relates to pK of the first carboxyl group in the case of polycarboxylic acids)

Esters with HLB values of between 5.5 and 8, obtained from polyols and from mono or polycarboxylic acids with less than 12 carbon atoms and with pK values greater than 4.5 (this value relates to the pK of the first carboxylic group in the case of polycarboxylic acids)

Esters with HLB values lower than 5.5 obtained from polyols and from fatty acids with 12-22 carbon atoms.

These compatibilizers can be used in quantities of from 0.2 to 40% weight and preferably from 1 to 20% by weight related to the starch. The starch blends can also contain polymeric compatibilizing agents having two components: one compatible or soluble with starch and a second one soluble or compatible with the polyester.

Examples are starch/polyester copolymers through transesterification catalysts. Such polymers can be generated trough reactive blending during compounding or can be produced in a separate process and then added during extrusion. In general block copolymers of an hydrophilic and an hydrophobic units are particularly suitable. Additives such as di and polyepoxides, di and poly isocyanates, isocyanurates, polycarbodiimides and peroxides can also be added. They can work as stabilizers as well as chain extenders.

All the products above can help to create the needed microstructure.

It is also possible to promote in situ reactions to create bonds between starch and the polymeric matrix. Also aliphatic-aromatic polymers chain extended with aliphatic or aromatic diisocyanates or di and polyepoxides or isocyanurates or with oxazo lines with intrinsic viscosities higher than 1 dl/g or in any case aliphatic-aromatic polyesters with a ratio between Mn and MFI at 190° C., 2,16 kg higher than 10 000, preferably higher than 12 500 and more preferably higher than 15 000 can also be used to achieve the needed microstructure.

Another method to improve the microstructure is to achieve starch complexation in the starch-polyester mixture.

Said blends show good properties also in case of starch blends in which the starch is not strongly complexed. With regard to the complexation of the starch, the teachings contained in EP-O 965 615 have to be intended as incorporated in the present description. The presence of the complexes of starch with one hydrophobic polymer incompatible with the starch can be demonstrated by the presence in the X-ray diffraction spectra of a peak in the range of the 13-14° on the 2 theta scale. According to the present invention, with the wording compositions in which the starch is not strongly complexed are intended the compositions where the Hc/Ha ratio between the height of the peak (Hc) in the range of 13-14° of the complex and the height of the peak (Ha) of the amorphous starch which appears at about 20.5° is less than 0.15 and even less than 0.07.

Advantageously, said starch blends contain at least one plasticizer for the starch to provide suitable rheological properties. This plasticizer can simply be water (even the water contained in the native starch alone without the need for further additions), or high boiling or polymeric plasticizers of the type mentioned above. Mixtures of different plasticizers are also preferred. The quantity of plasticizer is generally chosen on the basis of rheological needs and of the mixing system. In any case, plasticizers are advantageously added in a quantity of less than 30%, preferably less than 20%, still more preferably less than 10% in weight in relation to the starch on a dry basis.

Besides water, plasticizers that can be utilized in the compositions according to the invention are high boiling or polymeric plasticizers.

In the meaning of the present invention, high boiling plasticizers are meant plasticizers with boiling point higher than 250° C. Among these, those described in WO 92/14782, glycerol, diglycerol, triglycerol and tetraglycerol and mixtures thereof are preferred.

Particularly preferred are also mixtures of high boiling plasticizers containing at least 75% in weight, preferably 90% in weight of diglycerol, triglycerol and tetraglycerol. Said mixtures contain more than 50% in weight, preferably more than 80% in weight of diglycerol with respect to the total weight of diglycerol, triglycerol and tetraglycerol. The use of this type of high boiling plasticizers is particularly preferred as they prevent problems with fumes in processing environments and there are no frequent shutdowns made necessary for cleaning the machines during the composition processing.

In the meaning of the present patent application, with the term diglycerol are herein meant all compounds deriving from condensation reactions of two molecules of glycerol, such as alpha-alpha' diglycerol, alpha-beta diglycerol, beta-beta' diglycerol, their various cyclic isomers and mixtures thereof. As far as diglycerol is concerned, particularly preferred are mixtures comprising at least 70% in weight of alpha-alpha' diglycerol.

Starch blends containing water as the only plasticizer are also preferred. Among these, mixtures containing the water present in native starch as the only plasticizer particularly preferred.

Preferably the mixtures of copolyester according to the invention with the polymers of natural origin described above are characterised by a content of the said polymers of natural origin which varies within the range between 1 and 99% by weight, more preferably between 5 and 95% by weight and more preferably between 10 and 40% by weight with respect to the sum of the weights of the copolyester according to the invention and the former respectively.

The copolyester according to the invention may also be used in a mixture with polyolefins, non-biodegradable polyesters, polyester- and polyether-urethanes, polyurethanes, polyamides, polyamino acids, polyethers, polyureas, polycarbonates and mixtures thereof.

Among the polyolefins, polyethylene, polypropylene, their copolymers, polyvinyl alcohol, polyvinyl acetate, polyethylvinyl acetate and polyethylenevinyl alcohol are preferred.

Among the non-biodegradable polyesters, PET, PBT, PTT in particular with a renewables content >30% and polyalkylene furandicarboxylates are preferred. Among the latter polyethylene furandicarboxylate, polypropylene furandicarboxylate, polybutylene furandicarboxylate and their mixtures are preferred.

Examples of polyamides are: polyamide 6 and 6.6, polyamide 9 and 9.9, polyamide 10 and 10.10, polyamide 11 and 11.11, polyamide 12 and 12.12 and their combinations of the 6/9, 6/10, 6/11 and 6/12 type.

The polycarbonates may be polyethylene carbonates, polypropylene carbonates, polybutylene carbonates and their mixtures and copolymers.

The polyethers may be polyethylene glycols, polypropylene glycols, polybutylene glycols, their copolymers and their mixtures having molecular weights between 70,000 and 500,000.

Preferably the mixtures of the copolyester according to the invention with the polymers described above (polyolefins, non-biodegradable polyesters, polyester- and polyether-urethanes, polyurethanes, polyamides, polyamino acids, polyethers, polyureas, polycarbonates and mixtures thereof) are characterised by a content of the said polymers which varies within the range from 0.5 to 99% by weight, more preferably from 5 to 50% by weight with respect to the sum of the weights of the copolyester according to the invention and the former respectively.

The copolyester according to the invention can advantageously be used in blends with 5-30%, preferably 7-25% by weight of at least one rigid polymer with a modulus greater than 1,500 MPa. Said at least rigid polymer can be present as a further dispersed phase as well in lamellar structures or mixtures thereof.

As far as said further dispersed phase is concerned, said at least rigid polymer forms an homogeneously dispersed phase of particles with mean dimensions of less than 2 µm, preferably less than 1 µm.

The dimensions of said particles are measured according to the method of measurement above disclosed for starch particles.

Among rigid polymers, particularly preferred are polyhydroxyalkanoates, such as polylactic acid and polyglycolic acid and more preferably polymers or copolymers of polylactic acid containing at least 75% of L-lactic or D-lactic acid or combinations thereof, advantageously with molecular weight Mw greater than 70,000. Said rigid polymers can also be plasticized.

The selective etching of polylactic acid dispersed phase, may be advantageously performed with acetone as etchant with an etching time of 5 minutes at an etching temperature of 25° C. The copolyesters according to the invention can also be used in blends with the polymers of synthetic origin and polymers of natural origin mentioned above. Mixtures of polyesters with starch and polylactic acid are particularly preferred.

The blends of the copolyester according to the present invention with one or more polymers of the type mentioned above are particularly suitable for the production of films. Advantageously, the films obtained with said blends show excellent mechanical properties as well as high thermal resistance.

Blends of the copolyester according the present invention with PLA are of particular interest because their high compatibility with PLA polymers and copolymers permits to cover materials with a wide range of rigidities—which makes these blends particularly suitable for injection molding and extrusion.

To improve the transparency and toughness of such blends and decrease or avoid a lamellar structure of polylactide polymers, it is possible to introduce other polymers as compatibilizers or toughening agents such as: polybutylene succinate and copolymers with adipic acid and or lactic acid and or hydroxyl caproic acid, polycaprolactone, aliphatic polymers of diols from C2 to C13 and diacids from C4 to C13, polyhydroxyalkanoates, polyvinylalcohol in the range of hydrolysis degree between 75 and 99% and its copolymers, polyvinylacetate in a range of hydrolysis degree between 0 and 70%, preferably between 0 and 60%. Particularly preferred as diols are ethylene glycol, propandiol, butandiol and as acids: azelaic, sebacic, undecandioic acid, dodecandioic acid, brassylic acid and their combinations.

To maximize compatibility among the copolyester of the invention and polylactic acid it is very useful the introduction of copolymers with blocks having high affinity for the aliphatic-aromatic copolyesters of the invention, and blocks with affinity for the lactic acid polymers or copolymers. Particularly preferred examples are block copolymers of aliphatic aromatic copolyesters with polylactic acid. Such block copolymers can be obtained taking the two original polymers terminated with hydroxyl groups and then reacting such polymers with chain extenders able to react with hydroxyl groups such as diisocyanates. Examples are 1,6 hexamethylene diisocyanate, isophorone diisocyanate, methylene diphenildiisocyanate, toluene diisocyanate or the like. It is also possible to use chain extenders able to react with carboxylic groups like di and poly epoxides (e.g.

bisphenols diglycidyl ethers, glycerol diglycidyl ethers) divinyl derivatives if the polymers of the blend are terminated with acid groups. It is possible also to use as chain extenders carbodiimides, bis-oxazolines, isocyanurates etc.

The intrinsic viscosity of such block copolymers can be between 0.3 and 1.5 dl/g, more preferably between 0,45 and 1,2 dl/g. The amount of compatibilizer in the blend of aliphatic-aromatic copolyesters and polylactic acid can be in the range between 0.5 and 50%, more preferably between 1 and 30%, more preferably between 2 and 20% by weight.

The mixture according to the present invention can advantageously be blended also with nucleating agents and filler both of organic and inorganic nature.

Examples of nucleating agents include talc, saccharine sodium salt, calcium silicate, sodium benzoate, calcium titanate, boron nitride, zinc salts, porphyrin, chlorine, phlorin, porphodimethine, porphomethine, bacteriochlorin, isobacteriochorin, porphyrinogen, phorbin, isotactic polypropylene, PLA with low molecular weight and PBT.

The preferred amount of fillers is in the range of 0.5-70% by weight, preferably 5-50% by weight.

As regards organic fillers, wood powder, proteins, cellulose powder, grape residue, bran, maize husks, compost, other natural fibres, cereal grits with and without plasticizers such as polyols can be mentioned.

As regards inorganic fillers, it can be mentioned substances that are able to be dispersed and/or to be reduced in lamellas with submicronic dimensions, preferably less than 500 ntn, more preferably less than 300 nm, and even more preferably less than 50 nm. Particularly preferred are zeolites and silicates of various kind such as wollastonites, montmorillonites, hydrotalcites also functionalised with molecules able to interact with starch and or the specific polyester. The use of such fillers can improve stiffness, water and gas permeability, dimensional stability and maintain transparency.

The blends comprising the copolyester according to the present invention can be prepared by means of an extruder or any other machine capable of providing temperature and shear conditions that allows an homogeneous mixing of the components.

Said blends are advantageously obtainable by reactive extrusion process with compounds carrying groups which can react with OH and/or COOH groups, such as for example, polyepoxides and polycarbodiimides or unsaturated bonds such as for example peroxides.

Examples of peroxides that can advantageously be used are selected from the group of dialkyl peroxides, such as: benzoyl peroxide, lauroyl peroxide, isononanoyl peroxide, di-(t-butylperoxyisopropyl)benzene, t-butyl peroxide, dicumyl peroxide, alpha,alpha'-di(t-butylperoxy)diisopropylbenzene, 2,5-dimethyl-2,5 di(t-butylperoxy)hexane, t-butyl cumyl peroxide, di-t-butylperoxide, 2,5-dimethyl-2,5-di(t-butylperoxy)hex-3-yne, di(4-t-butylcyclohexyl)peroxydicarbonate, dicetyl peroxydicarbonate, dimyristyl peroxydicarbonate, 3,6,9-triethyl-3,6,9-trimethyl-1,4,7-triperoxonan, di(2-ethylhexyl)peroxydicarbonate and mixtures thereof.

Preferably, said peroxides are added to the polyesters according to the invention in a quantity of less than 0.5%, more preferably of 0.2% and even more preferably of 0.1% by weight.

Examples of polyepoxides that can advantageously be used are all polyepoxides from epoxidized oils and/or from styrene-glycidyl ether-methylmetacrylate, such as products distributed by BASF Resins B.V. under the trademark Joncryl® ADR, glycidyl ether methylmetacrylate included in a range of molecular weights between 1000 and 10000 and with a number of epoxides per molecule ranging from 1 to 30 and preferably from 5 to 25, and epoxides selected from the group comprising: diethylene glycol diglycidyl ether, polyethylene glycol diglycidyl ether, glycerol polyglycidyl ether, diglycerol polyglycidyl ether, 1,2-epoxybutane, polyglycerol polyglycidyl ether, isoprene diepoxide, and cycloaliphatic diepoxide, 1,4-cyclohexanedimethanol diglycidyl ether, glycidyl 2-methylphenyl ether, glycerol propoxylate triglycidyl ether, 1,4-butanediol diglycidyl ether, sorbitol polyglycidyl ether, glycerol diglycidyl ether, tetraglycidyl ether of meta-xylenediamine and diglycidyl ether of bisphenol A, and mixtures thereof.

Preferably, said polyepoxides are added to the polyesters according to the invention in a quantity of less than 2%, more preferably of 1% and even more preferably of 0,75% by weight.

Catalysts can also be used to increase the reactivity of the reactive groups. In the case of polyepoxides, salts of fatty acids can, for example, be used. Calcium and zinc stearates are particularly preferred.

Examples of carbodiimides that can advantageously be used are selected from the group comprising: poly(cyclooctylene carbodiimide), poly(1,4-dimethylene cyclohexylene carbodiimide), poly(cyclohexylene carbodiimide, poly(ethylene carbodiimide), poly(butylene carbodiimide), poly(isobutylene carbodiimide), poly(nonylene carbodiimide), poly(dodecylene carbodiimide), poly(neopentylene carbodiimide), poly(1,4-dimethylene phenylene carbodiimide), poly(2,2',6,6', tetra-isopropyl-diphenylene carbodiimide), (Stabaxol® D), poly(2,4,6-triisopropyl-1,3-phenylene carbodiimide) (Stabaxol® P-100), poly(1,3,5-triisopropyl-phenylene-2,4-carbodiimide), poly(2,6 diisopropyl-1,3-phenylene carbodiimide) (Stabaxol® P), poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), poly(naphthylene carbodiimide), poly(isophorone carbodiimide), poly(cumene carbodiimide), p-phenylene bis(ethylcarbodiimide), 1,6-hexamethylene bis(ethylcarbodiimide), 1,8-octamethylene bis(ethylcarbodiimide), 1,10-decamethylene bis(ethylcarbodiimide), 1,12 dodecamethylene bis (ethylcarbodiimide) and mixtures thereof. Preferably, said carbodiimides are added to the polyesters according to the invention in a quantity of less than 1.5%, more preferably of 0.75% and even more preferably of 0.5% by weight.

Thanks to its characteristics, the copolyester according to the invention is extremely suitable for the production of mono and bi-oriented films as well as either spunbonded or melt blown fibers.

The copolyester according to the present invention is also particularly suitable, alone or in a mixture with other polymers, for use in many practical applications such as films, injection moulded manufactures, extrusion coatings, fibres, foams, thermoformed items, etc.

In particular the copolyester and its mixtures are suitable for the production of:
- mono- and bi-oriented films, and films multilayered with other polymer materials;
- films for use in the agricultural sector, such as films for use in mulching;
- cling films for use with foodstuffs, for bales in agriculture, and for wrapping waste;
- bags and bin liners for organic collection, such as the collection of food wastes and gardening wastes;

thermoformed foodstuff packaging, both mono- and multilayered, as in containers for milk, yogurt, meats, beverages, etc.;

coatings obtained using the extrusion coating method;

multilayer laminates with layers of paper, plastic, aluminium, or metallised films;

expanded or expandable beads for the production of pieces obtained by sintering;

expanded and semi-expanded products, including foam blocks formed using pre-expanded particles;

foam sheets, thermoformed foam sheets, and containers obtained from them for use in foodstuff packaging;

fruit and vegetable containers in general;

composites with gelatinised, destructured and/or complexed starch, natural starch, flours or vegetable or inorganic natural fillers;

fibres, microfibres, composite microfibres in which the core constitutes rigid polymers such as PLA, PET, PTT and the outer skin constitutes the biodegradable polyester according to the invention, blended composite fibres, fibres with different cross-sections, from circular to multilobed, staple fibres, woven and nonwoven fabrics or spunbonded, melt blown or thermobonded fabrics for use in sanitary and hygiene products, and in the agricultural and clothing sectors.

They may also be used in applications as a replacement for plasticized PVC.

The process of production of the copolyester according to this invention may take place according to any of the known processes in the state of the art. In particular the copolyester may be advantageously obtained through a polycondensation reaction.

Advantageously the process of polymerisation of the copolyester may be performed in the presence of a suitable catalyst. Among such suitable catalysts mention may be made by way of example of organometallic compounds of tin, for example those deriving from stannoic acid, compounds of titanium, for example orthobutyltitanate, compounds of aluminium, for example Al-triisopropyl, and compounds of antimony and zinc.

Although the copolyester according to the present invention shows high mechanical properties, the skilled person will be easily able to even improve them e.g. by increasing its percentage of crystallinity. For example such increase can be obtained by stretching annealing or simply modulating the cooling rate of the polymer after its preparation.

Generally the polymers of the invention are characterized by a glass transition temperature comprised between 0° and +60° C., preferably between 5 and 40° C. and more preferably between 10 and 30° C.; melting point between 150-170° C. are preferred. After annealing for 12 to 18 hours in a range of temperature of 60-80° C. the tensile properties are preferably the following: stress at break >50 MPa, elongation at break >200%, Young's Modulus comprised between 1000 MPa and 1900 MPa, measured according to ASTM D638 standard.

Preferably, the copolyester according to the present invention is obtainable by reacting at least one precursor polyester having at least one acid component and at least one diol component with compounds carrying groups which can react with OH and/or COOH groups, such as for example, polyepoxides and polycarbodiimides or with radical initiators.

Said compounds can be used also in mixture.

Said at least one precursor copolyester may be of the aliphatic, aromatic or aliphatic-aromatic type.

The skilled person will easily be able to identify the actual molar ratios necessary with respect to the nature of the precursor copolyesters so as to obtain the desired copolyester.

Preferably, the copolyester according to the present invention is obtainable by a reactive extrusion process.

Among radical initiators, preferred are peroxides and among peroxides particularly preferred are organic peroxides. Organic peroxides can advantageously selected from the group consisting of: benzoyl peroxide, lauroyl peroxide, isononanoyl peroxide, di-(t-butylperoxyisopropyl)benzene, t-butyl peroxide, dicumyl peroxide, alpha,alpha'-di(t-butylperoxy)diisopropylbenzene, 2,5-dimethyl-2,5 di(t-butylperoxy)hexane, t-butyl cumyl peroxide, di-t-butylperoxide, 2,5-dimethyl-2,5-di(t-butylperoxy)hex-3-yne, di(4-t-butylcyclohexyl)peroxydicarbonate, dicetyl peroxydicarbonate, dimyristyl peroxydicarbonate, 3,6,9-triethyl-3,6,9-trimethyl-1,4,7-triperoxonan, di(2-ethylhexyl) peroxydicarbonate and mixtures thereof.

Preferably, said peroxides are added to the at least one precursor polyester in a quantity of less than 0.1%, more preferably of 0.05% and even more preferably of 0.02% by weight. Examples of polyepoxides that can advantageously be used are all polyepoxides from epoxidized oils and/or from styrene-glycidyl ether-methylmetacrylate, such as products distributed by BASF Resins B.V. under the trademark Joncryl® ADR, glycidyl ether methylmetacrylate included in a range of molecular weights between 1000 and 10000 and with a number of epoxides per molecule ranging from 1 to 30 and preferably from 5 to 25, and epoxides selected from the group comprising: diethylene glycol diglycidyl ether, polyethylene glycol diglycidyl ether, glycerol polyglycidyl ether, diglycerol polyglycidyl ether, 1,2-epoxybutane, polyglycerol polyglycidyl ether, isoprene diepoxide, and cycloaliphatic diepoxide, 1,4-cyclohexanedimethanol diglycidyl ether, glycidyl 2-methylphenyl ether, glycerol propoxylate triglycidyl ether, 1,4-butanediol diglycidyl ether, sorbitol polyglycidyl ether, glycerol diglycidyl ether, tetraglycidyl ether of meta-xylenediamine and diglycidyl ether of bisphenol A, and mixtures thereof.

Preferably, said polyepoxides are added to to the at least one precursor polyester in a quantity of less than 2%, more preferably of 1% and even more preferably of 0.75% by weight. Catalysts can also be used to increase the reactivity of the reactive groups. In the case of polyepoxides, salts of fatty acids can, for example, be used. Calcium and zinc stearates are particularly preferred.

Examples of carbodiimides that can advantageously be used are selected from the group comprising: poly(cyclooctylene carbodiimide), poly(1,4-dimethylene cyclohexylene carbodiimide), poly(cyclohexylene carbodiimide, poly(ethylene carbodiimide), poly(butylene carbodiimide), poly(isobutylene carbodiimide), poly(nonylene carbodiimide), poly(dodecylene carbodiimide), poly(neopentylene carbodiimide), poly(1,4-dimethylene phenylene carbodiimide), poly(2,2',6,6', tetra-isopropyl-diphenylene carbodiimide), (Stabaxol® D), poly(2,4,6-triisopropyl-1,3-phenylene carbodiimide) (Stabaxol® P-100), poly(1,3,5-triisopropyl-phenylene-2,4-carbodiimide), poly(2,6 diisopropyl-1,3-phenylene carbodiimide) (Stabaxol® P), poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), poly(naphthylene carbodiimide), poly(isophorone carbodiimide), poly(cumene carbodiimide), p-phenylene bis(ethylcarbodiimide), 1,6-hexamethylene bis(ethylcarbodiimide), 1,8-octamethylene bis(ethylcarbodiimide), 1,10-decamethylene bis(ethylcarbodiimide), 1,12 dodecamethylene bis(ethylcarbodiimide) and mixtures thereof. Preferably, said carbodiimides are added to the at least one precursor polyester in a quantity of less than 1.5%, more preferably of 0.75% and even more preferably of 0.5% by weight.

Said at least one precursor copolyester may preferably have an unsaturation content of 0.05-0.8 and more preferably of 0.1-0.7% in moles.

Said unsaturations can be generated in situ during the polymerization phase or during processing of the at least one precursor copolyester, through the addition of suitable unsaturated monomers or suitable unsaturated chain terminators.

Particularly preferred are precursor polyesters with terminal unsaturations.

Among unsaturated chain terminators, preferred are those having formula:

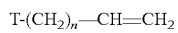

T-(CH$_2$)$_n$—CH=CH$_2$ wherein "T" is a group able to react with carboxylic and/or hydroxylic groups and "n" is an integer number comprised between 0 and 13.

Said unsaturated chain terminators can also be used in mixture.

With regard to "T", it is preferably selected from the group consisting of hydroxylic, carboxylic, amine, amide or ester group, hydroxylic or carboxylic groups being particularly preferred.

The integer "n" is preferably comprised between 1 and 13, more preferably 3 and 13, still more preferably 8 or 9, omega-undecenoic acid, omega-undecylenic alcohol and mixtures thereof being particularly preferred in order to maximize compatibility with polymers of natural origin.

Also after the preparation process, the copolyester according to the present invention can have double bonds and/or adducts deriving from the reaction of the unsaturations with the radical initiators.

The presence of the unsaturations and/or adducts deriving from their reaction with the radical initiators can be determined with different methods well known to those skilled in the art, such as NMR spectroscopy or by methanolysis reactions of the polymer chain coupled with chromatographic methods combined with mass spectrometry.

The skilled person will easily be able to identify structures referable either to the unsaturations or to the reacted unsaturation after the reaction.

Preferably, the copolyester according to the present invention is obtainable through a reactive extrusion process starting from a polyester precursor having a content of terminal acid groups in quantities of 35-150 meq of KOH/kg of the precursor polyester.

The measurement of terminal acid groups can be carried out as follows:

1.5-3 g of the polyester according to the invention are placed into a 50 ml Erlenmeyer flask. 35 ml of a mixture 70%-cresol/30% chloroform are added to dissolve the resin.

After complete dissolution the solution is left cool and then 5-6 drops of a solution 0.1% in ethanol of α-naphtolphtalein are added.

The solution thus obtained is titrated with a preliminary standardized KOH/benzyl alcohol solution. using the α-naphtolphtalein indicator for the determination of the equivalence point of the titration.

The terminal acid group content is calculated from the consumption of the KOH/benzyl alcohol solution based on the following equation:

Terminal acid group content (meq KOH/kg of polymer) =

$$\frac{\lfloor (V_{eq} - V_b) \cdot T \rfloor \cdot 1000}{P}$$

wherein:
$V_{eq}$=ml of KOH/benzyl alcohol solution at the equivalence point for the titration of the sample;
$V_b$=ml of KOH/benzyl alcoholsolution at the equivalence point for the blank titration;
T=concentration in moles/1 of the KOH/benzyl alcohol solution;
P=g of sample.

The invention will now be illustrated by some embodiments provided by way of example and without restricting the scope of protection of this patent application.

EXAMPLE 1

Synthesis of Polybutylene (Furandicarboxylate-Co-Sebacate) Containing 92% Mol of Butylenefuran Dicarboxylate Units The following were placed in a 200 ml two-necked glass reaction vessel provided with a Teflon propeller stirrer, a nitrogen connection and a water condenser connected to a distillate collection test tube:
Dimethylester of 2,5-furandicarboxylic acid (DMFD): 60.4 g (0.328 moles)
Sebacic acid: 5.8 g (0.028 moles)
Butanediol: 45.0 g (0.5 moles)
Esterification Stage The flask was immersed in an oil bath thermostatted to a temperature of 180° C. maintaining stirring at 400 rpm.

Water and methanol were distilled off during the reaction. The distillation was allowed to proceed for 30 minutes after which 100 ppm of tetraorthobutyltitanate (Tyzor® TnBT marketed by Dupont) were added as an esterification catalyst and the temperature of the oil bath was gradually raised to 235° C. over a period of 2 hours 30 minutes. The conversion achieved, calculated from the ratio between the quantity of distillates recovered during the reaction and the quantity which could be theoretically obtained from them, was >95%.

Polycondensation Stage

Subsequently the water condenser was replaced with an air condenser provided with a graduated conical-bottom test tube for the collection of distillates and a further 1000 ppm of Tyzor® TnBT were added as a polycondensation catalyst. The pressure was reduced to 1 mbar over a period of approximately 10 minutes.

The reaction was then continued for 4 hours raising the oil temperature to 245° C.

A product with an MFR (190° C., 2.16 kg)=12.6 g/10 min was obtained.

The product was analysed using a Perkin Elmer DSC differential scanning calorimeter, yielding the following results:
$T_m$=154° C.,
$\Delta H_f$=19.0 J/g,
$T_g$=21° C.

The polymer was subsequently characterised with regard to its mechanical properties according to ASTM D638 standard (see Table 1).

EXAMPLE 2

Using equipments and operative conditions according to Example 1a polybutylene (furandicarboxylate-co-sebacate) containing 97% mol of butylenefuran dicarboxylate units has been prepared.

The polymer was characterised with regard to its mechanical properties according to ASTM D638 standard (see Table 1).

COMPARATIVE EXAMPLE 1

Using equipments and operative conditions according to Example 1a polybutylene (furandicarboxylate-co-sebacate) containing 85% mol of butylenefuran dicarboxylate units has been prepared.

The polymer was characterised with regard to its mechanical properties according to ASTM D638 standard (see Table 1).

TABLE 1

| | % mol of butylenefuran dicarboxylate units | | |
|---|---|---|---|
| | 85 | 92 | 97 |
| Yield strength (MPa) | 15 | 24.5 | 19 |
| Tensile strength (MPa) | 51 | 52 | 60 |
| Elongation at break (%) | 420 | 380 | 380 |
| Elastic modulus (MPa) | 240 | 610 | 600 |

EXAMPLE 3

The copolyesters according to Example 1 and 2 and Comparative Example 1 have been annealed for 18 hours at 80° C. After annealing the copolyesters were characterized with regard to their mechanical properties according to ASTM D638 standard (see Table 2).

TABLE 2

| | % mol of butylenefuran dicarboxylate units | | |
|---|---|---|---|
| | 85 | 92 | 97 |
| Yield strength (MPa) | 23 | 30 | 60 |
| Tensile strength (MPa) | 57 | 54 | 59 |
| Elongation at break (%) | 440 | 360 | 275 |
| Elastic modulus (MPa) | 490 | 1550 | 1850 |

The invention claimed is:

1. Aliphatic-aromatic copolyester of a dicarboxylic component and a dihydroxylic component and comprising the following repeating units:

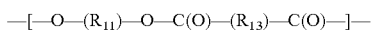

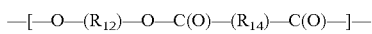

wherein the dihydroxylic component comprises units —O—($R_{11}$)—O— and —O—($R_{12}$)—O— deriving from a diol, wherein $R_{11}$ and $R_{12}$ are the same or different and are selected from the group consisting of $C_2$-$C_{14}$ alkylene, $C_5$-$C_{10}$ cycloalkylene, $C_2$-$C_{12}$ oxyalylene, heterocycles and mixtures thereof, wherein the dicarboxylic component consists of units —C(O)—($R_{13}$)—C(O)— deriving from an aliphatic diacid selected from the group consisting of succinic acid, adipic acid, pimelic acid, suberic acid, azelaic acid, sebacic acid, undecandioic acid, dodecandioic acid, brassylic acid, octadecandioic acid and mixtures thereof and units —C(O)—($R_{14}$)—C(O)— deriving from 2,5-furandicarboxylic acid of renewable origin and wherein the molar percentage of said 2,5-furandicarboxylic acid is at least 91% and lower than 100% of the dicarboxylic component, and wherein said diol comprises at least 50 mol % of 1,4-butanediol with respect to the total diol content, said aliphatic-aromatic copolyester having a Young's Modulus of at least 1000 MPa after annealing for 12-18 hours in a temperature range of 60-80° C.

2. Aliphatic-aromatic copolyester according to claim 1, wherein the molar percentage of said 2,5-furandicarboxylic acid is between 91 and 99%.

3. Aliphatic-aromatic copolyester according to claim 2, wherein the molar percentage of said 2,5-furandicarboxylic acid is between 92 and 98%.

4. Aliphatic-aromatic copolyester according to claim 1 wherein said aliphatic diacid is of renewable origin.

5. Aliphatic-aromatic copolyester according to claim 1, used in mixture with one or more additional polymers of synthetic or natural origin.

6. Mixture according to claim 5, wherein said one or more additional polymers of synthetic or natural origin is biodegradable.

7. Mixture according to claim 6, wherein said additional biodegradable polymer is a biodegradable polyester of the diacid-diol type, from hydroxyacid or of the polyester-ether type.

8. Mixture according to claim 7, wherein said additional biodegradable polyester of the diacid-diol type is aliphatic.

9. Mixture according to claim 7, wherein said additional biodegradable polyester of the diacid-diol type is aliphatic-aromatic.

10. Mixture according to claim 7, wherein said additional biodegradable polyester from hydroxyacid is selected from the group consisting of poly L lactic acid, poly D lactic acid and stereocomplexed poly D-L lactic, poly-ε-caprolactone, poly hydroxybutyrrate, poly hydroxybutirrate-valerate, poly hydroxybutirrate propanoate, poly hydroxybutirrate-hexanoate, poly hydroxybutirrate-decanoate, poly hydroxybutirrate-dodecanoate, poly hydroxybutirrate-hexadecanoate, poly hydroxybutirrate-octadecanoate, poly 3-hydroxybutirrate 4-hydroxybutirrate.

11. Mixture according to claim 6, wherein said additional polymer of natural origin is selected from the group consisting of starch, cellulose, chitin, chitosan, alginates, proteins, natural rubbers, rosinic acid and its derivatives, lignins as such, purified, hydrolyzed, basified and their derivatives.

12. Mixture according to claim 5, wherein said additional polymer is selected from the group consisting of a polyolefin, a non-biodegradable polyester, a polyester- and polyether-urethan, a polyurethan, a polyamide, a polyaminoacid, a polyether, a polyurea, a polycarbonate and mixture thereof.

13. An article produced from a copolyester according to claim 1 or mixture thereof with one or more additional biodegradable polymers of synthetic or natural origin being selected from the group consisting of:
mono- and bi-oriented films, and films multilayered with other polymeric materials;
films for use in the agricultural sector;
cling films for use with foodstuffs, for bales in agriculture, and for wrapping waste;
bags and bin liners for the organic waste collection;

thermoformed foodstuff packaging, both mono- and multi-layered;
coatings obtained using the extrusion coating method;
multilayer laminates with layers of paper, plastic, aluminium, or metallized films;
expanded or expandable beads for the production of pieces obtained by sintering;
expanded and semi-expanded products;
foam sheets, thermoformed foam sheets, and containers obtained from them for use in foodstuff packaging;
fruit and vegetable containers in general;
composites with gelatinised, destructured and/or complexed starch, natural starch, flours or vegetable or inorganic natural fillers;
fibres, microfibers, composite microfibers wherein the core is constituted by rigid polymers and the shell is constituted by said biodegradable polyester, blend composite fibres, fibres with different sections, from circular to multilobed, stample fibres, woven and nonwoven fabrics or spun bonded, melt blown or thermobonded for use in sanitary and hygiene products, and in the agricultural and clothing sectors.

* * * * *